Feb. 21, 1950
F. BUDRECK
2,498,065
VEHICLE REARVIEW MIRROR STRUCTURES HAVING AN ELASTIC MOUNTING BAND
Filed Dec. 23, 1947
2 Sheets-Sheet 1
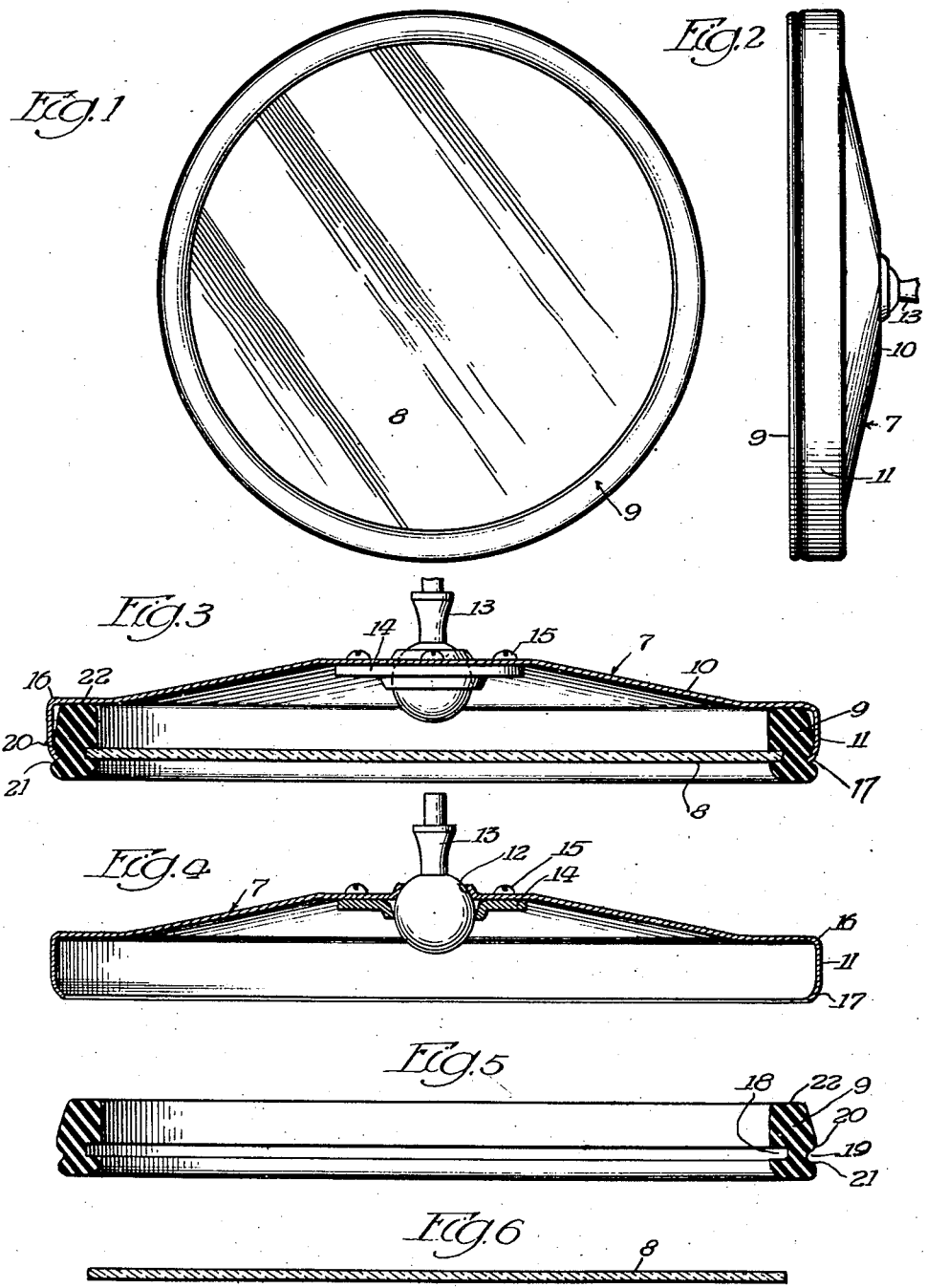
Inventor
Frances Budreck
By Fred Gerlach Atty.

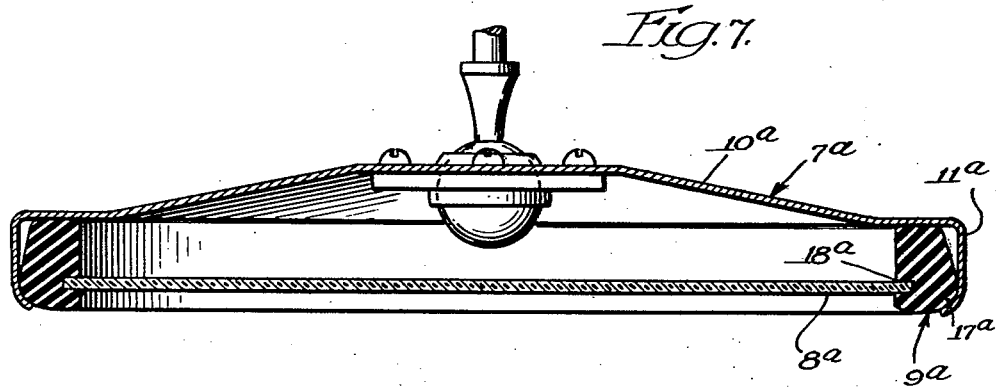
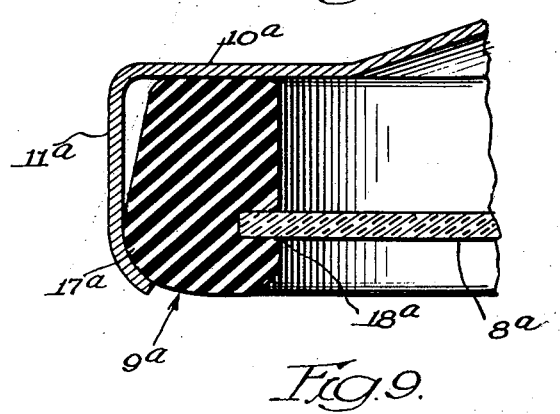
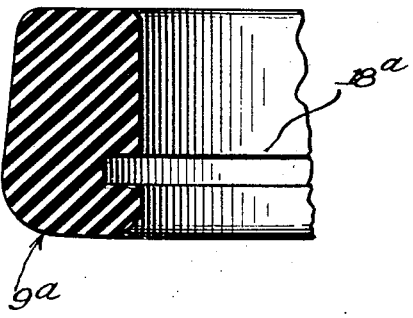

Patented Feb. 21, 1950

2,498,065

UNITED STATES PATENT OFFICE 2,498,065

VEHICLE REARVIEW MIRROR STRUCTURE HAVING AN ELASTIC MOUNTING BAND

Frances Budreck, Chicago, Ill., assignor to Monarch Tool & Machinery Co., Chicago, Ill., a corporation of Illinois Application December 23, 1947, Serial No. 793,344

6 Claims. (Cl. 88—96)

The present invention relates generally to rear view mirror structures. More particularly the invention relates to that type of mirror structure which is adapted to be mounted on the outside of the body of a truck or other vehicle by way of a conventional arm variety bracket, affords the truck driver or operator an opportunity to view objects behind or rearwards of the truck, and comprises as its principal components or parts a dished shell, a mirror plate adjacent the open side of the shell, and a continuous band of rubber-like material for yieldingly and resiliently holding the mirror plate in connected relation with the shell.

One object of the invention is to provide a rear view mirror structure of this type which is an improvement upon, and has certain inherent advantages over, previously designed structures and is characterized by simplicity of design or construction and the fact that the parts thereof may be assembled and dismantled with facility.

Another object of the invention is to provide a rear view mirror structure of the type under consideration in which the shell embodies a continuous, marginal wall which surrounds, and is spaced outwards from, the edge of the mirror plate and embodies at its outer or free margin a continuous inwardly extending flange, and the continuous band of rubber-like material is normally disposed in the space between the continuous marginal wall of the shell and the edge of the mirror plate and has a continuous internal groove in which the edge of the mirror plate is snugly seated and a continuous external seat in which the inwardly extending flange fits snugly.

A further object of the invention is to provide a rear view mirror structure of the last mentioned character in which the portion of the continuous band that is disposed inwards of the external seat is of substantially the same depth as the continuous marginal wall of the shell and has its outer periphery tapered inwardly in order to facilitate mounting and removal of the band with respect to the continuous marginal wall of the shell.

A still further object of the invention is to provide a rear view mirror structure which effectively and efficiently fulfills its intended purpose, may be manufactured at a reasonable cost and, due to the construction and design of the continuous band of rubber-like material, reduces to a minimum the possibility of mirror plate breakage due either to vibration or a blow.

Other objects of the invention and the various advantages and characteristics of the present rear view mirror structure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front view of a rear view mirror structure embodying one form of the invention;

Figure 2 is a side view of the mirror structure of Figure 1;

Figure 3 is an enlarged cross section of said mirror structure illustrating in detail the construction and design of the continuous band of rubber-like material and showing the manner in which it serves to hold the mirror plate in connected relation with the dished shell;

Figure 4 is an enlarged cross section of the shell of the Figure 1 mirror structure;

Figure 5 is an enlarged cross section of the continuous band of said mirror structure;

Figure 6 is an enlarged cross section of the mirror plate of the mirror structure of Figure 1;

Figure 7 is a cross section of a rear view mirror structure embodying another form of the invention;

Figure 8 is an enlarged fragmentary cross section illustrating in detail the construction and design of the continuous band of the mirror structure of Figure 7, and showing the manner in which it serves to hold the mirror plate in place; and Figure 9 is an enlarged fragmentary cross section showing the annular band of the mirror structure of Figure 6.

The rear view mirror structure which is shown in Figures 1 to 6 of the drawings constitutes one form or embodiment of the invention. It is adapted to be located exteriorly of the body of a truck or like vehicle and serves as a medium or instrumentality for permitting the truck driver or operator to view objects in back of the truck. A conventional arm variety bracket (not shown) serves to connect the mirror structure to the front portion of the body of the truck to which the structure is applied. As well understood in the art, such bracket is usually positioned adjacent the front left corner of the body of the truck and has one end thereof fixedly secured in place. Generally the arm variety bracket is disposed in a substantially horizontal position and extends transversely of the truck body. As its principal components or parts the rear view mirror structure that is shown in Figures 1 to 6, inclusive, comprises a dished shell 7, a mirror plate 8 and an attaching or mounting band 9. The drawing shows the mirror structure as being circular. It is to be understood, however, that the structure may be of any other shape or contour, such, for example, as square, rectangular or oval.

The shell 7 is preferably in the form of a one-piece sheet metal stamping and consists of a circular rear wall 10 and a cylindrical side wall 11. The central portion of the rear wall 10 is substantially flat and has in its center a flanged formed hole 12 through which extends one end of a mounting pin 13. Such end of the mounting pin is substantially spherical and is confined within the hole forming flange and an internally flanged ring shaped bracket plate 14 in order to form a universal joint whereby the shell 7 together with the mirror plate 8 and the band 9 may be adjusted angularly with respect to the mounting pin 13. The other or rear end of the mounting pin is shaped for connection to the outer end of the conventional arm variety bracket which serves to connect the rear view mirror structure as a whole to the truck body. The bracket plate 14 is secured in placed by screws 15. The intermediate portion of the rear wall 10 of the shell 7 is frusto-conical so far as contour is concerned, and the outer marginal portion of the rear wall is flat, as shown in Figures 3 and 4. The cylindrical side wall 11 is connected to the outer edge part of the flat outer marginal portion of the rear wall 10 of the shell by a right angle bend 16 and embodies at its outer or free margin an annular, inwardly extending, integral flange 17.

As shown in the drawing the cylindrical side wall 11 of the shell 7 is of appreciable depth. Preferably the inwardly extending flange 17 on the outer or free margin of the shell side wall 11 extends at an angle of approximately 45° with respect to the side wall.

The mirror plate 8 is in the form of a flat disc and consists of a circular plate of glass and a rear coating of standard mirror forming material. As shown in Figure 3, the mirror plate 8, when in its operative position, lies in substantially the same plane as the inwardly extending flange 17 on the outer or free margin of the cylindrical shell side wall 11. The diameter of the mirror plate is substantially less than the internal diameter of the flange 17.

The band 9 is in the form of a ring and serves releasably to hold the mirror plate 8 in connected relation with the shell 7. It also serves, when in its operative position, yieldingly or resiliently to support the mirror plate to the end that the latter is not likely to crack or fracture when subjected to vibration. Preferably the band 9 is formed of molded, solid, vulcanized rubber, although it is to be understood that it may, if desired, be formed of any other rubber-like or plastic variety material having elastic and resilient properties. As shown in Figure 3 the band 9 is shaped to fit within the cylindrical side wall 11 of the shell 7 and also to surround the mirror plate 8. The depth of the band is greater than the depth of the cylindrical side wall 9 to the end that when the band is in its operative or working position it has an externally positioned outer part and an internally positioned inner part. Between such parts the band has an internal annular groove 18 and an external annular groove 19.

The circumferential edge of the mirror plate 8 fits snugly within the internal annular groove 18. The corners of the groove are square so as to conform to the corners of the edge portion of the mirror plate. The portions of the band that define the sides of the groove 18 are spaced apart a slightly less distance than the thickness of the mirror plate and the diameter of the portion of the band that defines the bottom of the internal annular groove 18 is of slightly less diameter than the diameter of the mirror plate in order that when the mirror plate is seated within the groove 18 it is firmly gripped by the adjacent portions of the band. The external annular groove 19 in the band 9 is located in substantially the same plane as the internal annular groove 18. It forms an annular externally disposed inwardly extending seat and is adapted snugly to receive the inwardly extending flange 17 of the shell side wall 11, as shown in Figure 3. As a result of the fact that the edge of the mirror plate 8 fits snugly within the groove 18 and the inwardly extending flange 17 fits snugly within the groove 19 the interior of the shell is hermetically sealed and hence there is no possibility for moisture, snow or ice accumulating within the shell and causing damage or injury to the inner coated surface of the mirror plate. The portions of the band that define the inner and outer external corners of the groove 19 are designated by the reference numerals 20 and 21, respectively, and, as best shown in Figures 3 and 5, are rounded. The portion of the band that defines the bottom of the groove 19 is substantially semi-circular in cross section in order to provide the necessary tight joint between the band and the inwardly extending flange 17. The outer part of the band, i. e., the part that is outwards of the internal and external grooves, serves, in effect, as a bumper or buffer for protecting the mirror plate 8 against blows.

The inner part of the band 9 is of slightly greater depth than the cylindrical side wall 11 of the shell 7 in order that when the band is in place the rear end surface 22 thereof presses firmly against the flat outer marginal portion of the rear wall 10 of the shell. The inner periphery of the band is cylindrical. The outer periphery of the inner part of the band 9 is rearwardly and inwardly tapered as shown in Figures 3 and 5 to center, and facilitate mounting of, the band with respect to the shell. The diameter of the small end of the outer periphery of the inner part of the band is slightly less than the internal diameter of the inwardly extending flange 17 of the shell side wall 11, in order that the band may be readily piloted into place in connection with assembly.

In assembling the rear view mirror structure that is shown in Figures 1 to 6 the edge or outer margin of the mirror plate 8 is first seated within the internal annular groove 18 in the ring shaped band 9. This is done by stretching the band and then, while the band is stretched, manipulating the mirror plate so as to bring its edge within the confines of the groove. After mounting of the mirror plate with respect to the band the inner part of the band is placed against, and in centered relation with, the inwardly extending flange 17 of the shell side wall 11. Thereafter the band is forced towards the rear wall 10 of the shell until the inner end surface of the band is brought into abutment with the flat outer marginal portion of the shell rear wall and the inwardly extending flange 17 snaps into the external annular groove 19. In connection with forcing or pressing of the band into place the rearwardly or inwardly tapered outer periphery of the inner part of the band serves to hold the band in centered relation with the cylindrical side wall 11 of the shell and facilitates entry of the inwardly extending flange into the groove 19 with a snap action. In connection with rearward shift of the band toward the rear wall of the shell the inwardly extending flange 17 progressively compresses the inner part of the band until it is aligned with the groove 19. At such time it snaps into such groove and the compressed portions of the inner part of the band expand into their normal position, as shown in Figure 3. When it is desired to remove the band 9 in connection with replacement of the mirror plate 8 it is only necessary to compress the band and then pull it outwards relatively to the shell. By having the flange 17 extend inwards and outwards at approximately an angle of 45° with respect to the shell side wall and having the inner corner portion 20 of the groove 19 rounded the band may be pulled away from the shell with comparative ease. The outer part of the band forms, in effect, a handle whereby the band may be gripped when it is desired to pull it out of its normal or operative position.

The aforementioned rear view mirror structure is essentially simple in design or construction and hence is capable of being manufactured at a low cost. Due to the specific arrangement or construction of the ring shaped band 9 the three main parts of the mirror structure may be assembled and dismantled with facility. In addition, the mirror plate 8, when in place, is so yieldingly and resiliently supported that it is not likely to crack or fracture when subjected to shock or vibration.

The rear view mirror structure which is shown in Figures 7 to 9 of the drawings constitutes another form or embodiment of the invention. It comprises a dished shell 7a, a mirror plate 8a and an attaching or mounting band 9a. It serves the same purpose as the mirror structure of Figures 1 to 6. The shell 7a is exactly the same as the shell 7 and consists of a circular rear wall 10a and a cylindrical side wall 11a. The side wall 11a embodies at its outer or free margin an annular inwardly extending integral flange 17a. The mirror plate 8a is in the form of a disc and is the same as the mirror plate 8. The diameter of the mirror plate 8a is slightly less than the internal diameter of the annular, inwardly extending flange 17a. The band 9a is in the form of a ring and serves releasably to hold the mirror plate 8a in connected relation with the shell 7a. It is formed of any suitable elastic and resilient material, such, for example, as vulcanized rubber, and differs from the band 9 in that it includes no externally disposed outer part. The depth of the band 9a is slightly greater than the depth of the cylindrical side wall 11a of the shell 7a. The inner periphery of the band 9a is cylindrical and embodies an internal annular groove 18a in which the circumferential edge of the mirror plate 8a fits snugly. The groove 18a is the same in cross section as the groove 18 in the band 9 and is disposed a comparatively small distance rearwards or inwards of the front end surface of the band 9a. The front outer corner of the band 9a is rounded or convexly curved and forms an annular, inwardly extending seat which is adapted to fit snugly within and to abut yieldingly against the inner surface of the inwardly extending flange 17a. When the band 9 is in its operative position its outer end surface is substantially flush with the outer surface of said flange 17a. The portion of the outer periphery of the band 9a that is inwards or rearwards of the rounded or convexly curved front outer corner of the band is rearwardly and inwardly tapered in order to facilitate mounting of the band with respect to the shell. The diameter of the small end of the tapered outer peripheral portion of the band 9a is slightly less than the internal diameter of the inwardly extending flange 17a in order that the band 9a may be readily piloted into place when it is manipulated into assembled relation with the shell. As the result of the fact that the band 9a is of slightly greater depth than the side wall 11a of the shell 7a the band, when in place, is axially compressed and hence the inner end surface of the band presses yieldingly against the inner surface of the outer marginal portion of the rear wall 10a of the shell. The mirror structure of Figures 7 to 9 is assembled and dismantled in the same manner as the mirror structure of Figures 1 to 6. In connection with assembly the mirror plate 8a is first seated within the internal annular groove 18a in the band 9a. Thereafter the band is forced toward the rear wall 10a of the shell 7a until the inner end surface of the band is brought into abutment with the outer marginal portion of the shell rear wall and the flange 17a snaps over and into the externally disposed, inwardly extending seat which is formed by the rounded or convexly curved front outer corner of the band. The band 9a is removed by prying it or pulling it forwards with respect to the shell 7a.

It is to be understood that each of the herein described mirror structures may be used in places other than on a truck or other vehicle. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. As a new article of manufacture, a rear view mirror structure comprising a shell in the form of a rear wall and a continuous side wall connected to, and projecting in one direction from, the margin of the rear wall and provided at its outer margin with a continuous inwardly extending flange, a mirror plate positioned in spaced relation with the rear wall of the shell and having the margin thereof disposed adjacent, but spaced inwards from, the flange, and a removable functionally continuous mounting band of rubber-like material disposed for the most part within the side wall, having the outer periphery of the inner part so tapered in the direction of the rear wall that its small sized inner edge is smaller than the space within the inner edge of the flange and serves as a centering and piloting medium for the band in connection with mounting thereof with respect to the shell, and embodying between its inner and outer parts a functionally continuous internal groove in which the margin of the mirror plate fits snugly and a functionally continuous external seat forming groove in which the inwardly extending flange of the shell side wall is firmly seated.

2. As a new article of manufacture, a rear view mirror structure comprising a shell in the form of a rear wall and a continuous side wall connected to, and projecting in one direction from, the margin of the rear wall and provided at its outer margin with a continuous inwardly extending flange, a mirror plate positioned in spaced relation with the rear wall of the shell and having the margin thereof disposed adjacent, but spaced inwards from, the flange, and a readily removable continuous mounting band of rubber-like material disposed for the most part within the side wall, having the outer periphery of the inner part thereof so tapered in the direction of the rear wall that its small sized inner edge is smaller than the space within the inner edge of the flange and hence serves as a centering and piloting medium for the band in connection with mounting thereof with respect to the shell, and embodying between its inner and outer parts a continuous internal groove in which the margin of the mirror plate fits snugly and a continuous external seat forming groove in which the inwardly extending flange of the shell side wall is firmly seated, the inner part of the band being normally of greater width than the shell side wall in order that when the band is in its operative position said inner part is under compression and has its inner face pressing firmly against said margin of the shell rear wall.

3. As a new article of manufacture, a rear view mirror structure comprising a shell in the form of a circular rear wall and a truly cylindrical side wall connected to, and projecting in one direction from, the margin of the rear wall and provided at its outer margin with an annular inwardly projecting flange that extends away from said rear wall and is at approximately a 45° angle with respect to the side wall, a mirror plate positioned in spaced relation with the rear wall of the shell and having the margin thereof disposed adjacent, but spaced inwards of, the flange, and a removable annular mounting band of rubber-like material disposed for the most part within the side wall, having the outer periphery of its inner part so tapered in the direction of the rear wall that its small sized inner edge is of slightly less diameter than the inner diameter of the flange and hence serves as a centering and piloting medium for the band in connection with mounting thereof with respect to the shell, and embodying between its inner and outer parts a circumferential internal groove in which the margin of the mirror plate fits snugly and a coplanar circumferential outwardly flared external seat forming groove in which the aforesaid flange is firmly seated.

4. As a new article of manufacture, a rear view mirror structure comprising a shell in the form of a rear wall and a continuous transversely straight side wall connected to, and projecting at substantially right angles in one direction from, the margin of the rear wall and provided at its outer margin with a continuous flange that extends away from said rear wall and is at approximately an angle of 45° with respect to the side wall, a mirror plate positioned in spaced relation with the rear wall of the shell and having the margin thereof disposed adjacent, but spaced inwards of, the flange, and a removable continuous mounting band of elastic, resilient material disposed for the most part within the side wall, having the outer periphery of its inner part so tapered in the direction of the rear wall that its small sized inner edge is smaller than the space between the inner edge of the flange and hence serves as a centering and piloting medium for the band in connection with mounting thereof with respect to the shell, and embodying between its inner and outer parts a continuous internal groove in which the margin of the mirror plate fits snugly and a substantially coplanar continuous outwardly flared external seat forming groove in which the aforesaid flange of the shell side wall is firmly seated, the inner part of said band being normally of greater width than the side wall of the shell in order that when the band is in its operative position said inner part is under compression and has its inner face in firm abutment with the margin of the shell rear wall.

5. As a new article of manufacture, a rear view mirror structure comprising a one-piece shell in the form of a rear wall and a continuous side wall connected to, and projecting at right angles in one direction from, the margin of the rear wall and provided at its outer margin with a continuous inwardly extending pre-formed flange, a mirror plate positioned in spaced relation with the rear wall of the shell and having the margin thereof disposed adjacent, but spaced inwards from, the flange, and a removable functionally continuous mounting band of elastic resilient material fitting within the side wall, having the interiorly disposed portion of its outer periphery so tapered in the direction of the rear wall that its small sized inner edge is smaller than the space within the inner edge of the flange and hence serves as a centering and piloting medium for the band in connection with mounting thereof with respect to the shell, and embodying a functionally continuous internal groove in which the margin of the mirror plate fits snugly and a functionally continuous external inwardly extending seat against which said inwardly extending flange is seated, the part of the band between the latter's inner face and said seat being normally of greater width than the shell side wall in order that when the band is in its operative position said part is under compression and causes said inner face to press firmly against the margin of the shell rear wall.

6. As a new article of manufacture, a rear view mirror structure comprising a shell in the form of a rear wall and a continuous transversely straight side wall connected to, and projecting at right angles in one direction from, the margin of the rear wall and provided at its outer margin with a continuous inwardly projecting pre-formed flange that extends away from said rear wall and is at approximately a 45° angle with respect to said side wall, a mirror plate positioned in spaced relation with the rear wall of the shell and having the margin thereof disposed adjacent to, but spaced inwards from, the flange, and a removable functionally continuous mounting band of elastic resilient material fitting wholly within the side wall, having its outer periphery so tapered in the direction of the rear wall that its small sized inner edge is smaller than the space within the inner edge of the flange and hence serves as a centering and piloting medium for the band in connection with mounting thereof with respect to the shell, embodying a functionally continuous internal groove in which the margin of the mirror plate fits snugly, and having its front outer corner rounded or convexly curved and defining a functionally continuous external inwardly extending seat against which the inwardly extending flange is seated, said band being normally of greater width from front to back than the shell side wall in order that when the band is in its operative position its inner face presses firmly against said margin of the rear wall of the shell.

FRANCES BUDRECK.

REFERENCES CITED

The following references are of record in the file of this patent:

UNITED STATES PATENTS

| Number | Name | Date |
| --- | --- | --- |
| 702,763 | Aurness | June 17, 1902 |
| 2,202,697 | La Hodny | May 28, 1940 |
| 2,333,671 | Peters et al. | Nov. 9, 1943 |